United States Patent [19]
Wong

[11] 4,091,504
[45] May 30, 1978

[54] APPARATUS FOR PORTIONING EXTRUDABLE FOOD

[76] Inventor: Shing Kuel Wong, 901 S. Perkins, Memphis, Tenn. 38117

[21] Appl. No.: 757,822

[22] Filed: Jan. 10, 1977

[51] Int. Cl.² .................................................. A22C 11/04
[52] U.S. Cl. .................................................. 17/32; 17/45
[58] Field of Search .............................. 17/32, 36, 38; 99/450.7; 425/DIG. 35; 44/11, 12, 13; 100/DIG. 5

[56] References Cited

U.S. PATENT DOCUMENTS

| | | | |
|---|---|---|---|
| 1,054,464 | 2/1913 | Soucek | 100/DIG. 5 |
| 1,960,435 | 5/1934 | Dudley | 100/DIG. 5 |
| 2,393,130 | 1/1946 | Toulmin, Jr. | 100/DIG. 5 |
| 3,354,846 | 11/1967 | Ferrary et al. | 17/32 |
| 3,426,705 | 2/1969 | Faerber | 17/32 X |
| 3,488,798 | 1/1970 | Barnes, Jr. | 17/32 |
| 3,800,362 | 4/1974 | Wilson | 17/32 |
| 3,830,530 | 4/1958 | Powell | 100/DIG. 5 |
| 3,887,964 | 6/1975 | Richards | 17/32 |
| 3,928,891 | 12/1975 | Holly | 17/32 |
| 3,980,014 | 9/1976 | McEwien | 100/DIG. 5 |

*Primary Examiner*—Russell R. Kinsey
*Assistant Examiner*—Paul J. Hirsch
*Attorney, Agent, or Firm*—John R. Walker, III

[57] ABSTRACT

Subject apparatus might be used for making egg rolls, hushpuppies, croquettes, meat patties, and other such measures or items of food from extrudable food capable of being molded. The device includes at least one food chamber within which the specific item of food is formed. Particularly significant area: (1) The manner in which the item of food is compressed prior to being discharged from the food chamber. (2) The structure involved in interrupting the flow of food into the food chamber during the time that an item of food is being formed therein. (3) The manner in which the item of food is removed from the food chamber. (4) The structure involved in dislodging the item of food from certain piston and compacting head structure utilized in conjunction with the food chamber in forming the measure of food. (5) The manner in which cleaning action of the piston and compacting head structure is accomplished as the measure of food is dislodged therefrom. And, (6) the manner in which the tendency of the food to form a bridging-over or air-lock condition within the hopper, which contains the food to be extruded, is obviated.

13 Claims, 10 Drawing Figures

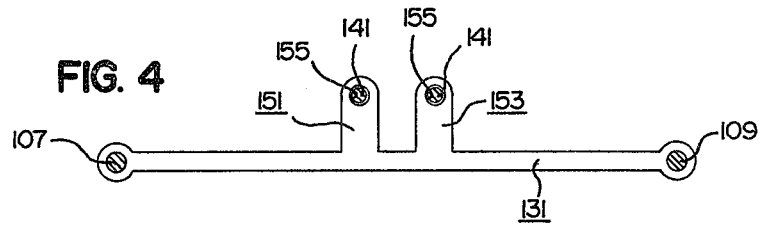
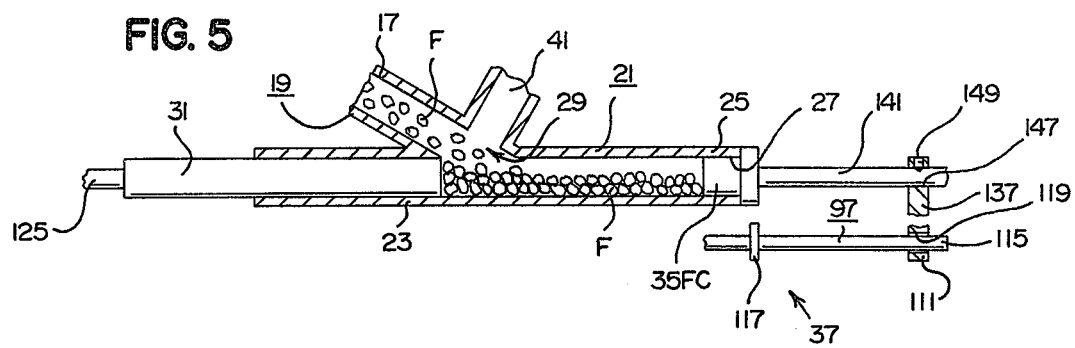
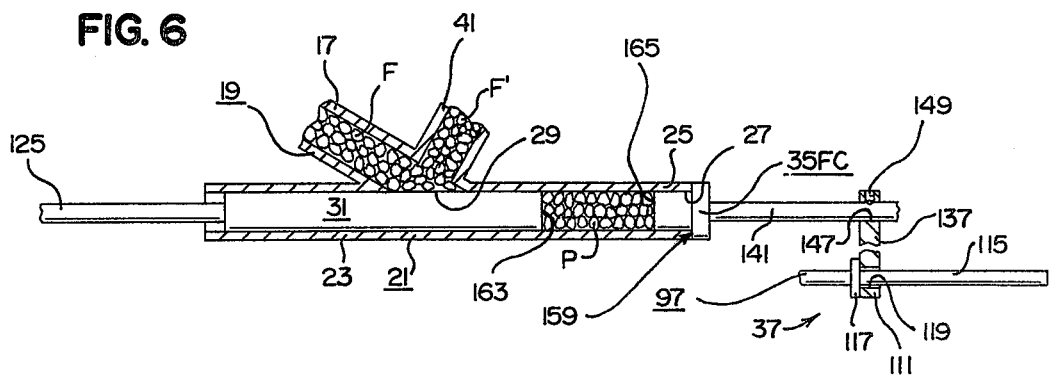
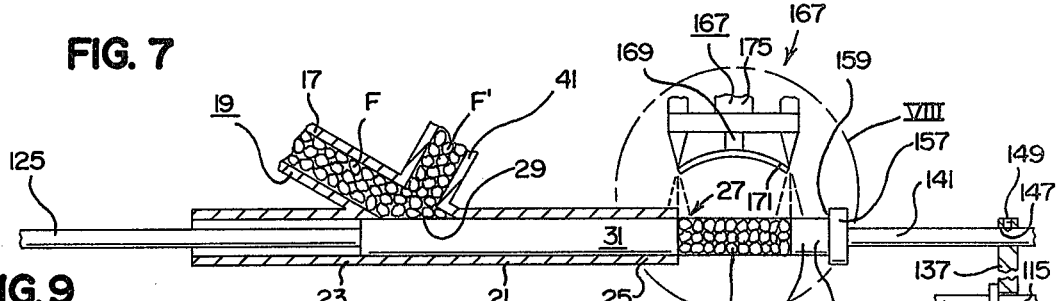
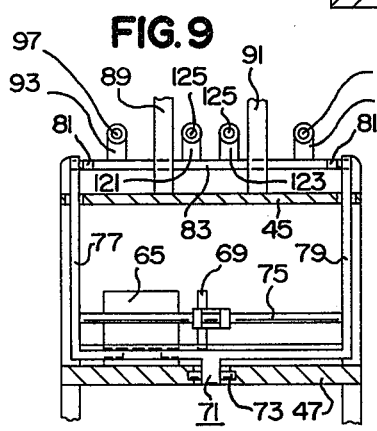
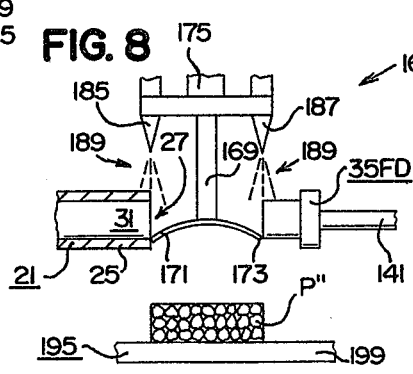

APPARATUS FOR PORTIONING EXTRUDABLE FOOD

BACKGROUND OF THE INVENTION

1. Field of the Invention

This invention relates to the field devices for portioning extrudabl food.

2. Description of the Prior Art

Numerous devices have been patented heretofore pertaining to devices for portioning extruded food; however, certain problems prevail in these prior devices as known by the applicant. A few of the particular problems are: First, the item of food is not properly compressed thus it often breaks up in the cooking process making it unsuitable for serving particularly to select clientele. Secondly, the established measure or portion of food is often broken in the process of removing it from the mold making it necessary to reaccomplish the molding process. Third, the residual food particles which tend to remain attached to the mold structure have presented problems as the apparatus goes through the recycling process. Fourth, the manner in which the tendency of the food to form a bridging-over or air-lock condition within the hopper, which contains the food to be extruded, has also been a problem. A preliminary patentability search revealed the following U.S. Pat. Nos. 2,820,247 to Michaud; 3,203,037 to Anhanger et al.; 3,230,579 and 3,433,647 to Johnston; 3,535,735 to Egee; 3,887,964 to Richards; and 3,913,175 to Peterson. It should be understood that none of the prior devices as known by the applicant suggest or disclose applicant's device.

SUMMARY OF THE INVENTION

The present invention is directed towards overcoming the problems and disadvantages of prior apparatuses for portioning extrudable food. The device of the present invention might be used for making egg rolls, hushpuppies, croquettes, meat patties, and other such measures or items of food from extrudable food capable of being molded. The device includes at least one food chamber within which the specific item of food is formed; however, in actual practice the device preferably would include a plurality of food chambers which are ganged together and operate identically one with the other. The following six items are particularly significant of the present invention: (1) The manner in which the item of food is compressed prior to being discharged from the food chamber. (2) The structure involved in interrupting flow of food into the food chamber during the time that the item of food is being formed therein. (3) The manner in which the item of food is removed from the food chamber. (4) The structure involved in dislodging the item of food from certain piston and compacting head structure utilized in conjunction with the food chamber in forming the measure of food. (5) The manner in which cleaning action of the piston and compacting head structure is accomplished as the measure of food is dislodged therefrom. (6) The manner in which the tendency of the food to form a bridging-over or air-lock condition within the hopper, which contains the food to be extruded, is obviated.

DESCRIPTION OF THE DRAWINGS

FIG. 4 is an enlarged sectional view taken as on the line IV—IV of FIG. 1 with considerable structure being conveniently deleted.

FIG. 5 is an enlarged partial view showing substantially the area circumscribed by the circular line V of FIG. 2 with certain structure being shown in a food charging position.

FIG. 6 is a view similar to FIG. 5 with the difference being that the structure alluded to above is shown herein in a food compacting position.

FIG. 7 is a view also similar to FIG. 5 the difference being the structure alluded to above is shown herein in a food discharging position and in which means for dislodging the measure of food is additionally shown herein.

FIG. 8 is an enlarged partial view of the area circumscribed by the circular line VIII of FIG. 7, showing the dislodging means in its fully actuated position with the dispensed measure of food shown restingly supported upon a conveyor belt assembly.

FIG. 9 is a sectional view taken as on the line IX—IX of FIG. 2.

FIG. 10 is a sectional view taken as on the line X—X of FIG. 2.

DESCRIPTION OF THE PREFERRED EMBODIMENT

Figure 1:
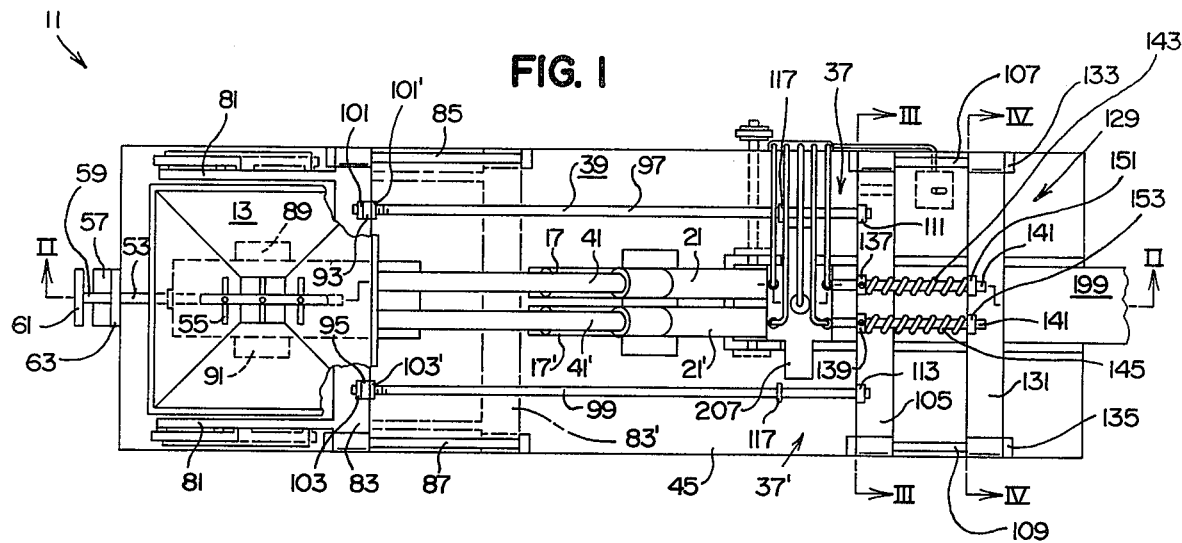
FIG. 1 is a top plan view of the apparatus of the present invention.

The food extruding apparatus 11 of the present invention includes a hopper 13 for receiving a supply of the food, characterized by the letter F, which is to be extruded. It should be understood that the apparatus 11 might be used for making egg rolls, hushpuppies, croquettes, meat patties, and other such measured portions or items of food all of which are intended to be characterized in FIG. 6 simply by the letter P. Also included are means, e.g., screw conveyor means 15 or the like, disposed within the hopper 13 for withdrawing food F from the hopper 13 and continuously urging the food F past a normal discharge point, as at 17. At this time, it might be well to point out that the apparatus 11 includes a multiplicity of dual or paired structure, e.g., the normal discharge point 17 in actuality preferably has a dual counterpart 17' as shown in FIG. 1 of the drawings. In the interest of brevity the following disclosure will usually be limited to mentioning just one component. However, occasionally the dual or sister component might be mentioned and will then be identified by the like numeral having a prime suffix in order to make the structure as depicted in FIG. 1 of the drawings more meaningful.

It will be appreciated by those skilled in the art that the normal discharge points 17, 17' are not as definitely established as the numerals depicted might indicate. For example, the normal discharge point 17 may simply be any reference point disposed along a food feeding tubular member 19, such as, the point 17 shown on the tubular member 19 in FIG. 2 of the drawings.

From FIGS. 1, 2 and 5-10 of the drawings it may be seen that the apparatus 11 includes a pair of food chamber means 21, 21' each having a size and shape substantially resembling each measure or portion of food P (FIG. 6) to be incorporated therein. Each food chamber means 21 is defined by a rearward portion, as at 23, and a forward portion, as at 25, with the forward portion 25 defining a food discharge opening, as at 27. Each food chamber means 21 is provided with an inlet opening, as at 29, disposed adjacent the rearward portion 23 and which is communicated with the normal discharge point 17 (or food feeding tubular member 19) whereby the food F is caused to flow into the food chamber means 21. The apparatus 11 includes reciprocatable piston means, as at 31, which is disposed within the food chamber means 21 and is movable between the rearward portion 23 and the forward portion 25 thereof in a manner to be fully disclosed as the specification proceeds. Also included is reciprocating drive means, as at 33 in FIG. 2 of the drawings, attached to the reciprocatable piston means 31 for causing reciprocating movement thereof. From FIG. 6 of the drawings it may be seen that the reciprocatable piston means 31 is caused to move past the inlet opening 29, thus the initial movement thereof blocks the inlet opening 29 interrupting the flow of the food F into the food chamber means 21. Therefore, the food F continues to move past the normal discharge point 17 but is diverted in a manner to be fully disclosed later in the specification; thus, it should be sufficient to simply state at this time that the onpassing or diverted flow of food is shown in FIGS. 6, 7 and characterized therein by the letter F'.

From FIGS. 2 and 5-8 of the drawings it may be seen that the apparatus 11 includes compacting head means 35 disposed adjacent the forward portion 25 of the food chamber means 21 and which is movable between a food charging position, as at 35 FC, and a food discharging position, as at 35 FD. From FIGS. 5 and 6 of the drawings it may be seen that the compacting head means 35 occludes the food discharge opening 27 when disposed in the food charging position 35 FC. And the food discharge opening 27 is unobstructed when the compacting head means 35 is disposed in the food discharging position 35 FD.

From FIGS. 1, 2 and 5-7 of the drawings it may be seen that the apparatus 11 also includes delayed action drive means, as at 37, for moving the compacting head means 35 from the food charging position 35 FC to the food discharging position 35 FD subsequent to a predetermined degree of movement of the reciprocatable piston means 31 to effect optimum compactness of the measure of food P during the initial phase of the movement of the reciprocatable piston means 31. Additionally, the apparatus 11 includes coupling means, as at 39, coacting with the reciprocating drive means 33 for subsequently causing the reciprocatable piston means 31 and the compacting head means 35 to move in unison during the discharge phase of the measure of food P as it passes outwardly through the food discharge opening 27.

Figure 2:
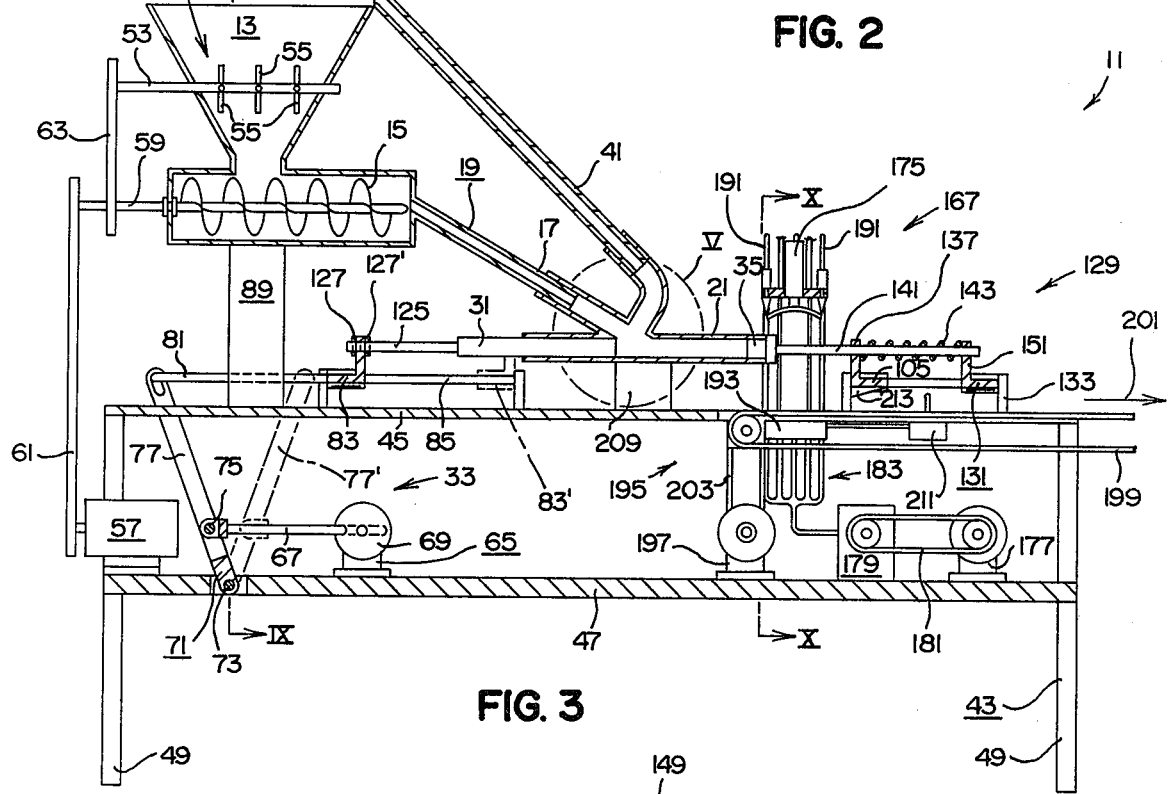
FIG. 2 is a sectional view taken as on the line II—II of FIG. 1.

From FIGS. 1 and 2 of the drawings it may be seen that the apparatus 11 includes means, e.g., food bypass conduit means 41 and 41', for diverting the continuous flow of food F from the discharge point 17 (or the food feeding tubular member 19) during the period while the flow of food F into the food chamber means 21 is being interrupted. Thus the flow of food from the discharge point 17 is alternately received in the food chamber means 21 and the food bypass means 41. This is diagrammatically shown in FIGS. 5 through 7 of the drawings wherein the food F which passes the normal discharge point 17 is either converted into a measured portion P (FIG. 6) or bypassed through the food bypass conduit 41, as characterized by the letter F'.

The apparatus 11 preferably includes a table-like structure, as at 43, having an upper horizontal surface 45, a lower horizontal surface 47 and a plurality of legs 49 which support the upper and lower horizontal surfaces 45, 47 an optimum distance above a floor or other supporting surface. The apparatus 11 also includes hopper agitator means, as at 51, for obviating the tendency of the food F to form a bridging-over or air-lock condition within the hopper 13 which would obstruct the normal flow of the food F. More specifically, the hopper agitator means 51 includes a rotatably driven horizontally disposed shaft 53 journaled to the hopper 13 in a manner well known to those skilled in the art, and a plurality of fingers 55 fixedly attached to the shaft 53, in any well-known manner as by welding or the like, and extending radially outwardly therefrom so as to continuously stir the food F contained within the hopper 13.

Particular attention is now directed to FIG. 2 of the drawings where it might be seen that suitably mounted upon the lower horizontal surface 47 is an electric motor 57 which rotatably drives the screw conveyor means 15 and the hopper agitator means 51. More specifically, attached to the motor 57 is a suitable pulley or sprocket (not shown) which is rotated by the electric motor in a manner well known to those skilled in the art. Suitably journaled to the hopper 13, is a shaft 59 having a pair of pulleys or sprockets fixedly attached thereto, i.e., an outer pulley and an inner pulley neither of which are shown in FIG. 2 of the drawings; however, the outer pulley or sprocket is rotatably driven by an endless belt or chain 61 thus causing the shaft 59 and the inner pulley to rotate. The shaft 53 is rotatably driven by having a pulley or sprocket (not shown) fixedly attached thereto and which is rotatably driven by an endless belt or chain 63.

The reciprocating drive means 33 alluded to above includes electric motor means 65 suitably mounted on the lower horizontal surface 47 as shown in FIGS. 2 and 9 of the drawings. Also included therewith is pitman means including a pitman rod 67 that connects a rotary member 69 with a bifurcated reciprocating member 71. The bifurcated reciprocating member 71 pivots about a pivot pin 73 and includes a horizontally disposed shaft 75 extending between a pair of reciprocating arms 77, 79 which are fixedly attached thereto, as best viewed in FIG. 9 of the drawings.

From FIG. 2 of the drawings it may be seen that the upper ends of the respective reciprocating arms 77, 79 are suitably coupled to one end of a pair of push-rods, as at 81, which in turn have the other ends thereof suitably coupled to a cross-head 83, i.e., the pair of push-rods 81 are shown in FIG. 1. The crosshead 83 is free to slide to and fro along a pair of guide bars 85, 87, as best shown in FIGS. 1 and 2 of the drawings. Thus, the reciprocating arms 77, 79 are pivoted about the pivot pin 73 between a rearwardmost position simply shown in FIG. 2 by the numeral 77 and a forward position shown in phantom lines and characterized by the numeral 77'. Likewise, the crosshead 83 is moved between a rearward position characterized by the numeral 83 and a forwardmost position shown in phantom lines and characterized therein by the numeral 83'.

The hopper 13 is conveniently supported a spaced distance above the upper horizontal surface 45, i.e., a pair of vertically disposed support members 89, 91 are indicated herein for this purpose.

The coupling means 39 alluded to above includes a pair of lug members 93, 95 fixedly attached to the crosshead 83 in any well-known manner, as by welding or the like, and as best shown in FIGS. 1, 2 and 9 of the drawings. The coupling means 39 also includes a pair of push-rods 97, 99 as best shown in FIG. 1 of the drawings. One of the respective ends of the push-rods 97, 99 are suitably attached to the lug members 93, 95, as with adjustable jam nuts 101, 101', and 103, 103' or the like. The other respective ends of the push-rods 97, 99 are attached to a forwardly disposed crosshead 105 in a manner about to be disclosed. The crosshead 105 is slidably attached to a pair of guide bars 107, 109. A pair of lug members 111, 113 are fixedly attached to the crosshead 105 in any well-known manner as by welding or the like. The forward ends of each of the push-rods, as at 115 for the push-rod 97 and as clearly shown in FIGS. 5 through 7 of the drawings, includes sleeve members 117 which are fixedly attached to the forward ends 115 in any well-known manner, as by being integrally formed therewith. The lug members 111, 113 are provided with apertures, as at 119 for the lug member 11 as shown in FIGS. 5 through 7, for slidably receiving the forward ends 115 of the push-rods 97, 99.

It will be appreciated by those skilled in the art that the delayed action drive means 37 alluded to above functions in conjunction with the coupling means 39. Therefore, certain features of the delayed action drive means 37 will now be disclosed before attempting to completely disclose the remaining portions of the coupling means 39. The delayed action drive means 37 includes the forward ends 115, the sleeve members 117, and the apertures 119 above disclosed. From the above disclosure it should now be apparent to those skilled in the art that forward movement of the crosshead 83 causes forward travel of the push-rods 97, 99. However, movement of the forward crosshead 105 is delayed for a predetermined degree of movement of the crosshead 83 to effect optimum compactness of the measure of food P (FIG. 6) during the initial phase of the movement of the crosshead 83. This causes the sequence of events depicted in FIGS. 5 through 7 of the drawings to transpire and these events will be fully disclosed later in the specification.

Each of the reciprocatable piston means 31 is attached to the rearward crosshead 83 in a manner as follows: A pair of lug members 121, 123 (FIG. 9) are fixedly attached to the rearward crosshead 83 in any well-known manner as by welding or the like. A pair of push-rods, as at 125 in FIG. 2 of the drawings, couples the piston means 31 with the respective lug members 121, 123 in any convenient manner, e.g., a pair of adjustable jam nuts 127, 127' are threadedly received on the push-rods 125.

The coupling means 39 also includes bias means, as at 129 in FIGS. 1 and 2 of the drawings, for yieldably urging the compacting head means 35 rearwardly or toward the food chamber means 21 when the compacting head means 35 is in the food charging position 35 FD (FIGS. 5 and 6).

Figure 3:
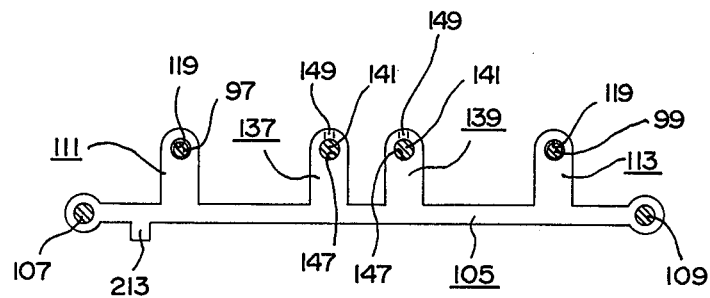
FIG. 3 is an enlarged sectional view taken as on the line III—III of FIG. 1 with considerable structure being conveniently deleted

From FIGS. 1, 2 and 4 of the drawings it will be seen that the bias means 129 preferably includes a substantially stationary crosshead 131. However, the crosshead 131 may also be slidably attached to the guide bars, 107, 109 even though slidable movement of the crosshead 131 may not be evident. The guide bars 107, 109 are supported with stop members 133, 135 which function to arrest or prevent forward travel of the crosshead member 131. Also included are a pair of lug members 137, 139 (FIGS. 1, 2, 3 and 9) which are fixedly attached to the forward crosshead 105 in any well-known manner, as by welding or the like. Each of the compacting head means 35 is driven by a push-rod 141 as clearly shown in FIGS. 1 through 3 and 5 through 8 of the drawings. Also included therewith are a pair of compression spring members 143, 145 which are spirally whirled about the push-rods 141 as clearly shown in FIG. 1 of the drawings. As shown in FIG. 3 of the drawings, the push-rods 141 extend through a pair of apertures 147 provided in the lug members 137, 139.

The bias means 129 also includes locking means, e.g., a pair of set screws 149 or the like, which are threadedly urged inwardly into the apertures 147 so as to bind the push-rods 141 with the lug members 137, 139. Thus, the spring members 143, 145 not only urge the crosshead 131 forwardly, i.e., against the arresting stop members 133, 135 into its normally stationary position, but also urge the forward crosshead 105 rearwardly or toward the food chamber means 21. Thus, the compacting head means 35 are urged toward the food chamber means 21 in like manner, i.e., since the push-rods 141 are fixed to the crosshead 105 as previously mentioned. From FIGS. 1 and 4 of the drawings, it may be seen that the bias means 129 also includes a pair of lug members 151, 153 which are fixedly attached to the substantially stationary crosshead 131 in any well-known manner as by welding or the like. The lug members 151, 153 are respectively provided with apertures 155 for slidably receiving the push-rods 141 as best viewed in FIG. 4. Therefore, the push-rods 141 are full floating since one of the respective ends of the compression spring members 143, 145 restingly engage the lug members 137, 139 while the other ends thereof restingly engage the lug members 151, 153 as clearly shown in FIG. 1 of the drawings.

Therefore, it should now be apparent that the reciprocating drive means 33 coacting with the coupling means 39 moves the reciprocatable piston means 31 and the compacting head means 35 through the forward portion 25 of the food chamber means 21 as the discharge phase of the measure of food transpires with the measure of food ultimately reaching an external position, as at P' (FIG. 7), where it is suspended between the reciprocatable piston means 31 and the compacting head means 35 now being disposed externally of the food chamber means 21 subsequently to passing through the food discharge opening 27.

More specifically, the food F is forced into the food chamber 21 as shown in FIG. 5 with the piston 31 being to the rear as shown therein. The drive means 33 urges the piston means 31 forwardly thus closing off the inlet opening 29 as clearly indicated in FIG. 6 of the drawings. It should be noted in FIG. 6 that the compacting head means 35 is still in the same position as it was during the food charging cycle as shown in FIG. 5; however, the sleeve members 117 have moved forwardly so as to be in a position to engage the lug members 111, 113. Accordingly, continued advancing movement of the drive means 33 brings the piston means 31 to the position shown in FIG. 7 and simultaneously causes the compacting head means 35 to move in unison therewith as the discharge phase of the measure of food P' (FIG. 7) transpires, or it is urged outwardly through the food discharge opening 27 thus assuming an external interim position. It should be understood that the sleeve members 117 relieve the bias action which normally acts upon the compacting head means, i.e., when in the positions shown in FIGS. 5 and 6 of the drawings; thus, the measure of food P' as shown suspended in FIG. 7 is not being squeezed by the compression spring members 143, 145.

With further reference to FIG. 7 of the drawing it will be noted that the compacting head means 35 includes an enlarged or exterior member 157 having a shoulder 159 defining an interior boss portion 161 which is received within the food chamber means 21 when the compacting head means 35 is in the food charging position 35 FC with the shoulder 159 restingly engaging the exterior portion of the food chamber 21 which defines the food discharge opening 27 thereof as the bias means 129 urges the compacting head means 35 inwardly in the previously disclosed manner.

Referring now to FIG. 6 of the drawings in which it will be seen that the reciprocatable piston means 31 and the compacting head means 35 respectively include a pair of substantially planar confrontingly arranged face members 163, 165.

Particular attention is now directed towards FIGS. 7, 8 and 10 of the drawings wherein it may be seen that the apparatus 11 includes dislodging means 167 for dislodging the externally disposed measure of food P' (FIG. 7) from between the reciprocatable piston means 31 and the compacting head means 35 subsequent to the measure of food reaching the external position.

The dislodging means 167 includes wiper means 169 having a pair of remotely disposed wiper elements 171, 173 for respectively wipingly engaging the pair of face members 163, 165, i.e., of the piston means 31 and the head means 35.

More specifically, the wiper means 169 includes a pneumatic actuating cylinder 175 which is sequentially operated to move the wiper elements 171, 173 downwardly. An electric motor 177 drives a pneumatic pump means 179 through an endless blet or chain 181 with said pump means 179 delivering air under pressure to a manifold 183, all of which is clearly shown in FIG. 2 of the drawings. From the above disclosure it should now be apparent that the dislodging means 167 includes the pneumatic actuated cylinder means 175 which is coupled to the wiper means 169 for urging the wiper elements 171, 173 thereof to simultaneously move across the face members 163, 165, i.e., of the reciprocatable piston means 31 and the compacting head means 35.

In addition, the dislodging means 167 preferably includes a pair of pneumatic jet blast nozzle means 185, 187 (a pair for each food chamber means 21) which are directed to play a blast of air, as at 189, adjacent to the pair of wiper elements 171, 173 with the blast of air 189 impinging the confrontingly arranged face members 163, 165 for assisting in dislodging the measure of food P' (FIG. 7) from the reciprocatable piston means 31 and the compacting head means 35. The pneumatic jet blast nozzle means 185, 187 are communicated with the manifold 183 through suitable conduits as at 191 (FIG. 2). It should be mentioned that suitable control means, e.g., solenoids or the like as at 193 in FIG. 2, are sequentially operated in a manner well known to those skilled in the art to deliver air under pressure to the cylinder means 175 and the nozzle means 185, 187.

The apparatus 11 preferably includes conveyor means 195 for receiving the incorporated measures of food subsequent to the dislodging action thereof, i.e., subsequent to the actuation of the dislodging means 167, and for carrying the measures of food to another location as desired. Thus, the dislodged measure of food is depicted in FIG. 8 of the drawings and character referenced therein by the letter P having a double prime suffix a P''. The dislodging means 167 is disposed above the conveyor means 95 whereby the incorporated measures of food P'' simply drop onto the conveyor means as indicated in FIG. 8 of the drawings.

As shown in FIG. 2 of the drawings, the conveyor means 195 is provided with an electric motor 197 which drives an endless conveyor belt 199 forwardly in the direction of an arrow 201 through an endless drive belt or chain 203. However, it should be understood that the conveyor belt 199 may be suitably arranged so as to move the measures of food P'' in a direction opposite to the arrow 201 if desirable. Additionally, it may be desirable to delete the conveyor means 195 in its entirety.

The dislodging means 167 is conveniently supported a spaced distance above the upper horizontal surface 145 in any well-known manner; however, a pair of vertical support members 205, 207 are indicated in FIG. 10 for this purpose. Further, the food chamber means 21 individually and/or collectively are conveniently supported a spaced distance above the upper horizontal surface 45 by suitable support members indicated as at 209 in FIG. 2 of the drawings.

As shown in FIG. 2 of the drawings, the solenoids 193 preferably are actuated by a microswitch 211; however, other suitable means are anticipated which may be the equivalent of the microswitch 211, e.g., valve structure for diverting the output from the pump means 179 in a manner well known to those skilled in the art. The microswitch 211 is actuated by a cam member 213 which is attached to the forward crosshead 105. Thus, the forward travel of the crosshead 105 in the direction of the arrow 201 depresses the microswitch 211 for a predetermined period of time thus actuating the dislodging means 167 in a manner as above described.

Although the invention has been described and illustrated with respect to a preferred embodiment thereof it is to be understood that it is not to be so limited since changes and modifications may be made therein which are within the full intended scope of the invention.

I claim:

1. In a food extruding apparatus of the type having a hopper for receiving a supply of the food to be extruded and means disposed within said hopper for withdrawing food from said hopper and continuously urging the food past a normal discharge point, the improvement which comprises food chamber means having a size and shape substantially resembling each measure of food to be incorporated therein, said food chamber means being defined by a rearward portion and a forward portion with said forward portion defining a food discharge opening, said food chamber means being provided with an inlet opening disposed adjacent said rearward portion and being communicated with said normal discharge point whereby the food is caused to flow into said food chamber means, reciprocatable piston means disposed within said food chamber means and being movable between said rearward and forward portion thereof, reciprocating drive means attached to said reciprocatable piston means for causing reciprocating movement thereof with said reciprocatable piston means being caused to move past said inlet opening thus the initial movement thereof interrupts the flow of the food into said food chamber means, compacting head means disposed adjacent said forward portion of said food chamber means and being movable between a food charging position and a food discharging position, said compacting head means occluding said food discharge opening when disposed in said food charging position and said food discharge opening being unobstructed when said compacting head is disposed in said food discharging position, delayed action drive means for moving said compacting head means from said food charging position to said food discharging position subsequent to a predetermined degree of movement of said reciprocatable piston means to effect optimum compactness of the measure of food during the initial phase of the movement of said reciprocatable piston means, coupling means coacting with said reciprocating drive means for subsequently causing said reciprocatable piston means and said compacting head means to move in unison during the discharge phase of the measure of food as it passes outwardly through said food discharge opening, and dislodging means for dislodging the measure of food from between said reciprocatable piston means and said compacting head means, said dislodging means including pneumatic jet blast means for assisting in dislodging the measure of food from said reciprocatable piston means and said compacting head means.

2. The apparatus as set forth in claim 1 in which is included means for diverting the continuous flow of food from said normal discharge point during the period while the flow of food into said food chamber means is being interrupted.

3. The apparatus as set forth in claim 2 in which said means for diverting the continuous flow of food from said discharge point includes food bypass conduit means communicating said discharge point with said hopper thus the flow of food from said discharge point is alternately received in said food chamber means and said food bypass means.

4. The apparatus as set forth in claim 1 in which said reciprocating drive means coacting with said coupling means moves said reciprocatable piston means and said compacting head means through said forward portion of said food chamber means as the discharge phase of the measure of food transpires with said measure of food ultimately reaching an external position where it is suspended between said reciprocatable piston means and said compacting head means externally of said food chamber means subsequently to passing through said food discharge opening.

5. The apparatus as set forth in claim 4 in which said reciprocatable piston means and said compacting head means respectively include a pair of substantially planar confrontingly arranged face members, and in which said dislodging means includes wiper means having a pair of remotely disposed wiper elements for respectively wipingly engaging said pair of face members.

6. The apparatus as set forth in claim 5 in which said dislodging means includes pneumatic actuated cylinder means coupled to said wiper means for urging said wiper elements thereof to simultaneously move across said face members of said reciprocatable piston means and said compacting head means.

7. In a food extruding apparatus of the type having a hopper for receiving a supply of the food to be extruded and means disposed within said hopper for withdrawing food from said hopper and continuously urging the food past a normal discharge point, the improvement which comprises food chamber means having a size and shape substantially resembling each measure of food to be incorporated therein, said food chamber means being defined by a rearward portion and a forward portion with said forward portion defining a food discharge opening, said food chamber means being provided with an inlet opening disposed adjacent said rearward portion and being communicated with said normal discharge point whereby the food is caused to flow into said food chamber means, reciprocatable piston means disposed within said food chamber means and being movable between said rearward and forward portion thereof, reciprocating drive means attached to said reciprocatable piston means for causing reciprocating meovement thereof with said reciprocatable piston means being caused to move past said inlet opening thus the initial movement thereof interrupts the flow of the food into said food chamber means, compacting head means disposed adjacent said forward portion of said food chamber means and being movable between a food charging position and a food discharging position, said compacting head means occluding said food discharge opening when disposed in said food charging position and said food discharge opening being unobstructed when said compacting head is disposed in said food discharging position, delayed action drive means for moving said compacting head means from said food charging position to said food discharging position subsequent to a predetermined degree of movement of said reciprocatable piston means to effect optimum compactness of the measure of food during the initial phase of the movement of said reciprocatable piston means, coupling means coacting with said reciprocating drive means for subsequently causing said reciprocatable piston means and said compacting head means to move in unison during the discharge phase of the measure of food as it passes outwardly through said food discharge opening and for moving said reciprocatable piston means and said compacting head means through said forward portion of said food chamber means as the discharge phase of the measure of food transpires with said measure of food ultimately reaching an external position where it is suspended between said reciprocatable piston means and said compacting head means externally of said food chamber means subsequently to passing through said food discharge opening, and dislodging means for dislodging the measure of food from between said reciprocatable piston means and said compacting head means subsequent to the measure of food reaching said external position, said reciprocatable piston means and said compacting head means respectively including a pair of substantially planar confrontingly arranged face members, said dislodging means including wiper means having a pair of remotely disposed wiper elements for respectively wipingly engaging said pair of face members, said dislodging means including a pair of pneumatic jet blast nozzle means respectively directed to play a blast of air adjacent to said pair of wiper elements with the blast of air impinging said confrontingly arranged face members for assisting in dislodging the measure of food from said reciprocatable piston means and said compacting head means.

8. The apparatus as set forth in claim 4 in which is included conveyor means for receiving the incorporated measures of food subsequent to the dislodging action thereof and for carrying them to another location, said dislodging means being disposed above said conveyor means whereby the incorporated measures of food simply drop onto said conveyor means.

9. The apparatus as set forth in claim 4 in which said coupling means includes bias means for yieldably urging said compacting head means rearwardly toward said food chamber means when said compacting head means is in said food charging position.

10. The apparatus as set forth in claim 9 in which said compacting head means includes an exterior member having a shoulder defining an interior boss portion which is received within said food chamber means when said compacting head means is in said food charging position with said shoulder restingly engaging the exterior portion of said food chamber which defines said food discharge opening thereof as said bias means urges said compacting head means inwardly.

11. The apparatus as set forth in claim 1 in which is included hopper agitator means for obviating the tendency of the food to form a bridging-over or air-lock condition within said hopper which would obstruct the normal flow of the food.

12. The apparatus as set forth in claim 11 in which said hopper agitator means includes a rotatably driven horizontally disposed shaft journaled to said hopper, and a plurality of fingers fixedly attached to said shaft and extending radially outwardly therefrom so as to continuously stir the food contained within said hopper.

13. In a food extruding apparatus of the type having a hopper for receiving a supply of the food to be extruded and means disposed within said hopper for withdrawing food from said hopper and continuously urging the food past a normal discharge point, the improvement which comprises food chamber means having a size and shape substantially resembling each measure of food to be incorporated therein, said food chamber means being defined by a rearward portion and a forward portion with said forward portion defining a food discharge opening, said food chamber means being provided with an inlet opening disposed adjacent said rearward portion and being communicated with said normal discharge point whereby the food is caused to flow into said food chamber means, reciprocatable piston means disposed within said food chamber means and being movable between said rearward and forward portion thereof, reciprocating drive means attached to said reciprocatable piston means for causing reciprocating movement thereof with said reciprocatable piston means being caused to move past said inlet opening thus the initial movement thereof interrupts the flow of the food into said food chamber means, compacting head means disposed adjacent said forward portion of said food chamber means and being movable between a food charging position and a food discharging position, said compacting head means occluding said food discharge opening when disposed in said food charging position and said food discharge opening being unobstructed when said compacting head is disposed in said food discharging position, delayed action drive means for moving said compacting head means from said food charging position to said food discharging position subsequent to a predetermined degree of movement of said reciprocatable piston means to effect optimum compactness of the measure of food during the initial phase of the movement of said reciprocatable piston means, and coupling means coacting with said reciprocating drive means for subsequently causing said reciprocatable piston means and said compacting head means to move in unison during the discharge phase of the measure of food as it passes outwardly through said food discharge opening.

* * * * *